Nov. 25, 1941.   I. STEIN   2,263,747
DRY SHAVING MACHINE
Filed May 17, 1938
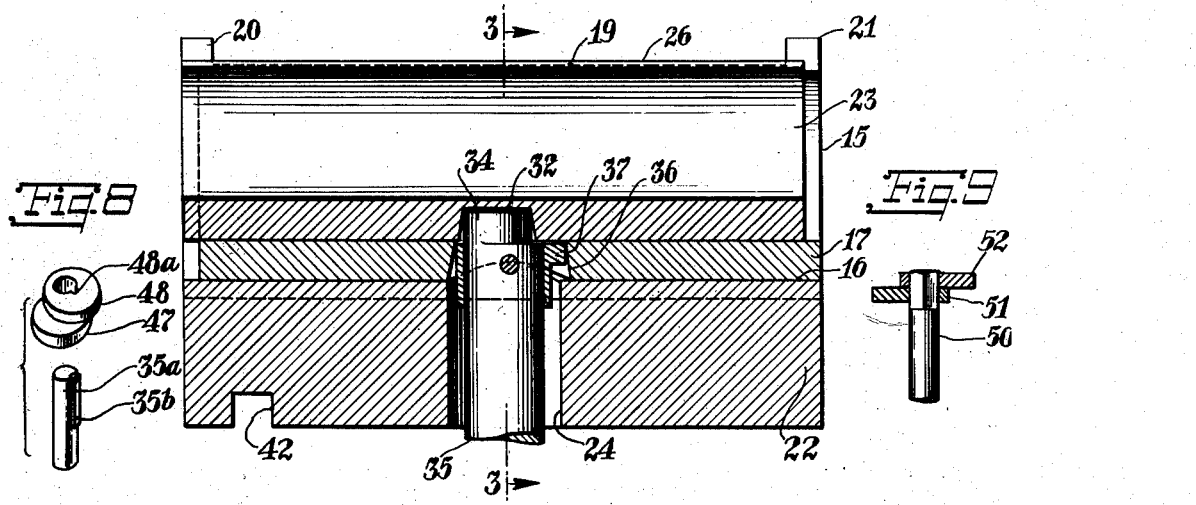
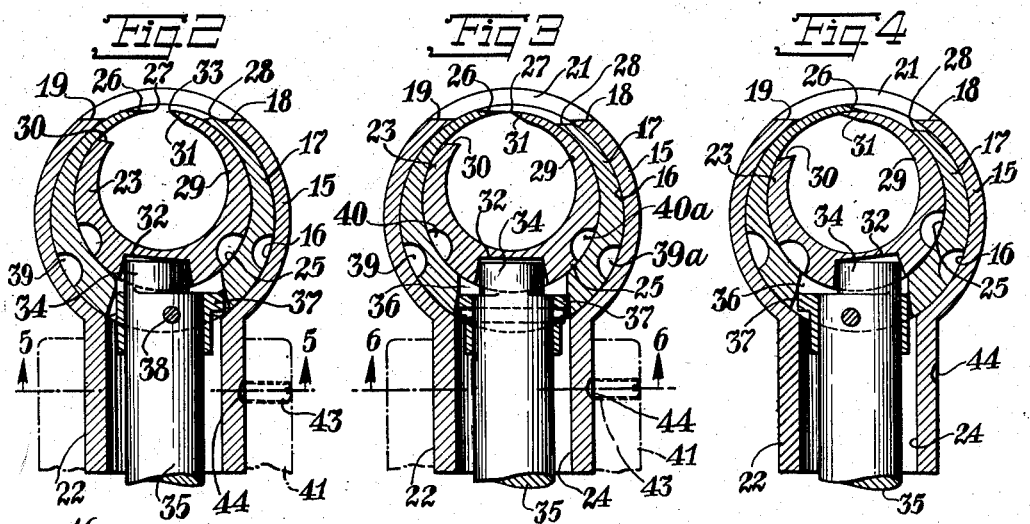
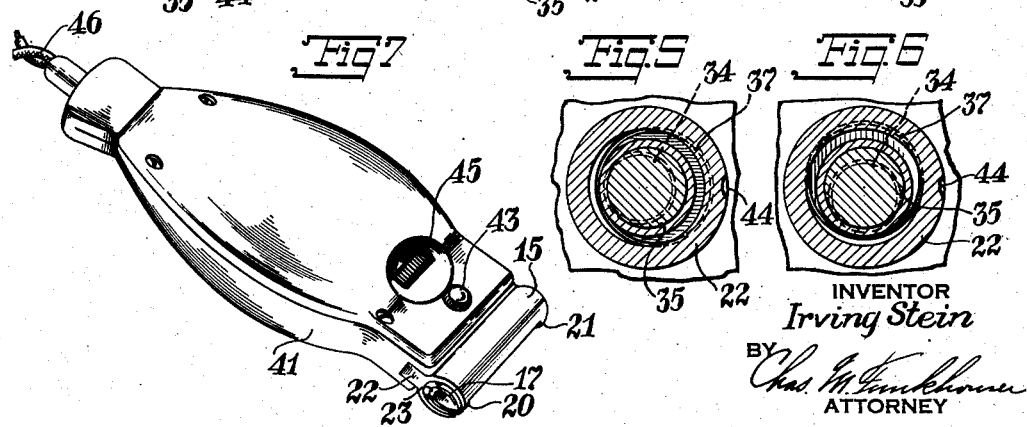
INVENTOR
*Irving Stein*
BY
*Chas. M. Funkhouser*
ATTORNEY Patented Nov. 25, 1941

2,263,747

UNITED STATES PATENT OFFICE 2,263,747

DRY SHAVING MACHINE

Irving Stein, Monticello, N. Y.

Application May 17, 1938, Serial No. 208,471

14 Claims. (Cl. 30—43)

This invention relates to improvements in dry shaving machines and has for an object the provision of a machine capable of shaving an area of substantial width at each stroke.

Another object is the provision of a shaving machine having a pair of movable members each carrying a shearing edge and means for moving said members into and out of shearing relation to each other, said members when out of shearing relation presenting an open slot to the skin of the user.

A further object is the provision in a shaving machine of members each carrying a shearing edge, and means for moving said members back and forth laterally to bring the shearing edges into and out of shearing relation, said means also moving said members in opposite directions longitudinally.

Other objects and structural advantages will be apparent as they are unfolded hereinafter.

Referring to the drawing which depicts one embodiment of the invention by way of example:

Figure 1 is a longitudinal vertical section of the cutting head showing the shearing members and cam means for moving them;

Figure 2 is a transverse sectional elevation of the device shown in Figure 1 with the shearing edges of the shearing members separated;

Figure 3 is a transverse sectional elevation of the device similar to that shown in Figure 2 except that the shearing edges have advanced toward each other to a point where the shearing edges have just begun to engage each other;

Figure 4 is an elevation similar to those shown in Figures 2 and 3 except that the shearing edges have moved to the points of maximum overlap;

Figure 5 is a sectional view taken along the lines 5—5 of Figure 2;

Figure 6 is a sectional view taken along the lines 6—6 of Figure 3;

Figure 7 is a perspective view of a complete shaving machine embodying my new improvements;

Figure 8 is a view showing a modification of the driving cam arrangement in which the cams are provided with keyways and in which the shaft carrying a key may be disengaged from the cams without removing the cams from the shearing members with which they are engaged; and Figure 9 is a view showing an alternate driving cam arrangement in which the cams are driven by a square shaft which may be disengaged from the cams without removing the cams from the shearing members with which they are engaged.

The cutting head of my improved shaving machine is comprised of a hollow circular body 15 which has a finished interior bore 16 which forms a bearing surface for a movable shear member 17. The hollow circular body 15 has a portion thereof cut away leaving flat surfaces 18 and 19 and end circular portions 20 and 21 which form guards to prevent the skin from coming in contact with the ends of the movable shear member 17 and the other movable shear member 23 mounted within the member 17 and to be presently described. The open space between the flat surfaces 18 and 19 and between the circular end portions makes the shearing members accessible.

The circular body 15 has a base portion 22 of rectangular cross section preferably formed integral therewith. A hole 24 formed in the base 22 extends therethrough and communicates with the interior bore of the circular body 15.

The movable shear member 17 is hollow and is provided with a finished bore 25 which is eccentric with respect to its outer diameter. A part of the wall of the member at its thinnest portion is cut away longitudinally of the member to form surfaces 26 and 28 and to form a shearing edge 27. In some cases the surfaces 26 and 28 may have concavely curved outlines.

The movable shearing member 23 has a circular outer surface which forms a working fit with the inner bore 25 of the member 17, and a circular inner surface 29 which is eccentric to the outer surface thereof.

The inner member 23 is also cut away longitudinally to form surfaces 30 and 31 and a shearing edge 33.

In order to move the shearing edges 27 and 33 into and out of engagement with each other novel means are provided. A depression 32 is formed in the thick portion of the wall of the shearing member 23. This depression is in the form of a tapered hole, and a cam 34 which may be formed integral with the drive shaft 35, which extends through the hole 24 in the base 22, engages the wall of said tapered hole. The walls of the hole 32 are made tapered to permit the shearing member to move both laterally and longitudinally. It is obvious that the hole 32 could extend through into the bore 29 of the member 23 but in constructing it as shown, cut hairs are prevented from getting into the vital working parts of the device.

The shear member 17 has a hole 36 extending through the thickest portion of its wall, and a cam 37 keyed on to the shaft 35 cooperates with the tapering wall of the hole 36 to give the shear member 17 both a lateral and longitudinal movement also. In the embodiment herein shown and described the cams or eccentrics 34 and 37 are provided with throws and are so timed that the shearing edges 27 and 33 are approximately twenty thousandths of an inch (0.20") apart at the maximum opening thereof, they meet each other on the vertical center line of the device, and the shearing edge 27 overlaps the edge 33 a substantial amount at the other extreme throw of the cams or eccentrics 34 and 37. It is obvious that other throws, overlaps, etc., may be obtained by varying the cams, the holes into which they extend and the angularity between the cams without departing from the invention.

The member 17 is provided with longitudinal grooves 39, 39a, and the member 23 is provided with similar grooves 40, 40a to import into the members a degree of flexibility. This permits the members to be made the full diameter of the holes or bores in which they fit, and the grooves lend enough flexibility to the members to cause them to form "no play" fits in said bores.

Figure 5 shows the relation of the shearing members with respect to the cams 34 and 37 when the shearing members 17 and 23 are in the position of maximum separation of the shearing edges, Figure 2, while Figure 6 shows the relative positions of the cams when the shearing edges of the members 17 and 23 are just beginning to come in contact as in Figure 3. When the shearing edges are in the overlapped relation shown in Figure 4 the cams are substantially 180 degrees or diametrically opposite the positions shown in Figure 5.

Figure 7 shows a complete shaving machine comprised of a head such as that described above; a casing 41 supports the head and carries a locating key (not shown) which is engaged by a slot 42 formed in the base 22 (Figure 1). A screw 43 engages a depression 44 formed in the base 22 and secures the cutting head in the casing. A suitable motor in the casing 41 rotates the shaft 35 and a suitable friction wheel 45 is provided for starting the motor after the connector cord 46 is connected to a source of current.

In Figure 8 the individual cams or eccentrics 47, 48 are positioned in suitable holes in the members 17 and 23 respectively and their keywayed holes, one of which appears at 48a, are in line with each other and the keyways therein are in line so that the shaft 35a carrying a key 35b may be inserted into or removed from the holes without removing the cams from the holes in members with which they are associated.

Figure 9 shows a modification in which the shaft itself or the end thereof may be formed square as designated by the numeral 50, or any other cross section eliminating the necessity for keys or keyways and cams or eccentrics 51 and 52 taking the places of the cams 37 and 34 respectively may each be the same diameter, the holes in the shearing members also being of corresponding diameters whereby the cams may remain in the holes in their respective shearing members and the square shaft may be withdrawn and reinserted without having to bother with matching keys with keyways. This would also obviate the necessity of setting the members in certain positions approximately before the cam shaft will enter the holes in the members 17 and 23.

Although a simple embodiment of the invention is herein shown and described it is obvious that many changes may be made in the showing without departing from the spirit of the invention as defined in the appended claims.

I claim:

1. In a shaving machine, a stationary body having a longitudinal bore and having a longitudinal portion cut away to provide a rectangular opening communicating with the interior thereof, the ends of said openings being bounded by narrow webs integral with said body, a tubular movable member forming a working fit with the bore in said body, a second tubular movable member forming a working fit with the interior of said first movable member, means forming a shearing edge on each of said members, said edges being opposed and adapted to cooperate with each other to shear, and means for synchronously moving said members toward each other and away from each other to bring said shearing edges respectively into and out of shearing relation with each other, the space between said shearing edges when the latter are out of shearing relation with each other forming an open longitudinal slot bounded by said shearing edges along its sides and said webs at each end thereof.

2. In a shaving machine, a stationary body member having a finished interior bore and having a longitudinal portion cut away to form a passage communicating with said bore and having solid end webs defining the ends of said passage, a base extending from said body and having a hole formed therein communicating with said bore, a cylindrical movable member mounted in and forming a working fit with said bore, a second cylindrical movable member positioned within said first member, means forming shearing edges on said members and driving means extending through said hole and engaging said members for oscillating the latter to bring said shearing edges into and out of shearing relation with each other, said webs being adapted to prevent the ends of said members from pinching the user's skin.

3. In a shaving machine, a hollow tubular body having a finished interior bore having a portion cut away to provide a lonigtudinal opening communicating with said bore and having circular end portions defining the length of said opening, a base extending from said body and having a hole formed therein at right angles to said bore, a tubular movable member mounted in and forming a working fit with said bore, a second tubular movable member positioned within said first movable member, means forming shearing edges on said members, a shaft extending through the hole in said base, means for rotating said shaft, and means carried on said shaft in cooperative relation with both of said members for simultaneously moving the latter into and out of shearing relation with each other.

4. In a shaving machine, a hollow circular body having a finished interior bore having a portion cut away to provide an opening communicating with said bore and having circular end portions defining said opening longitudinally, a base extending from said body and having a hole formed therein angularly with respect to said bore, a curved movable member mounted in and forming a working fit with said bore, a second curved movable member positioned within said first movable member, means forming shearing edges on said members, a shaft extending through the hole in said base, means for rotating said shaft, means forming an opening in said first movable member, means forming an opening in said second movable member, and cam means carried on said shaft and engaging the openings in said members for moving the latter into and out of shearing relation with each other.

5. In a shaving machine, a stationary body member having a finished interior bore and having a portion cut away to form an opening communicating with said bore, said body also having end portions or webs forming the longitudinal boundaries of said openings, a base extending from said body and having a hole formed therein, a curved movable member mounted in and forming a working fit with said bore, a second curved movable member positioned within said first movable member, means forming shearing edges on said members, a tapered hole formed in each of said members, a shaft extending through a hole in said base, means for rotating said shaft, and a pair of eccentric members having throws angular with respect to each other, one of said eccentrics engaging the tapered hole formed in the first movable member and the other engaging the tapered hole in said second movable member, said eccentrics being adapted to move said members into and out of shearing relation with each other and also to oscillate said members longitudinally when said shaft is rotated.

6. A shaving machine according to claim 4 in which the tapered hole in said second movable member is smaller in diameter than the tapered hole in said first movable member, and in which the eccentric engaging the hole in said second member is smaller in diameter than the eccentric engaging the hole in said first movable member.

7. In a shaving machine including two tubular members each carrying a shear edge, said shearing edges being adapted to be moved relative to each other to bring said shearing edges into and out of shearing relationship, a driving means comprised of a shaft, a pair of eccentrics carried by said shaft and having their throws angular with respect to each other, and openings formed in said members, the opening in one of said members being adapted to engage and cooperate with one of said eccentrics and the opening in the other of said members being ..dapted to engage and cooperate with the other of said eccentrics to move said members relative to each other in accordance with said throws.

8. A shaving machine according to claim 4 in which like tapered holes are formed in both of said curved movable members and in which said means carried on said shaft comprises an eccentric positioned in each of said holes, each of said eccentrics having formed therein a shaft hole and a keyway, and in which said shaft is provided with a key adapted to enter said keyways when the machine is associated with the shaft, and to be removed from the keyways leaving said eccentrics in position in their respective holes when the machine is disassociated from said shaft.

9. A shaving machine according to claim 4 in which like tapered holes are formed in both of said curved movable members, and in which said means carried on said shaft comprises an eccentric positioned in each of said holes, each of said eccentrics having formed therein a square shaft hole, and in which an end portion of said shaft is made of square cross section and adapted to fit said square holes, thereby enabling the shaft to be associated with the machine in driving relation without the necessity of a keyway.

10. In a shaving machine, a hollow tubular body having a portion cut away to provide a longitudinal opening communicating with the interior thereof, a pair of tubular movable members mounted in said body each carrying a longitudinal shearing edge, one of said members forming a bearing for the other and said shearing edges being opposed whereby when said members are both oscillated the shearing edges are alternately brought into and out of shearing relation with each other, and power means connected in common with both of said movable members for oscillating them and thereby moving said shearing edges into and away from shearing relation with each other.

11. In a shaving machine, a pair of curved movable members of crescent cross section each having a continuous longitudinal shearing edge, a tubular casing forming a housing for both said movable members and having a longitudinal opening formed therein giving access to said shearing edges, and power means connected in common with both said members for oscillating both said members to bring said shearing edges into and out of shearing relation with each other.

12. In a shaving machine, a pair of tubular movable members, one of said members being nested in the other, means forming opposed continuous longitudinal shearing edges on said members, a tubular casing forming a housing for both said movable members and having a longitudinal opening formed therein giving access to said shearing edges, and power means operatively connected to both said members for oscillating both said members simultaneously in opposite directions to bring said shearing edges into and out of shearing relation with each other.

13. In a shaving machine, a pair of tubular movable members, one of said members being nested in the other, means forming opposed continuous longitudinal shearing edges on said members, a tubular casing forming a housing for both said movable members and having a longitudinal opening formed therein giving access to said shearing edges, and power means connected to both said members for oscillating said members to bring their shearing edges into and out of shearing relation with each other laterally, said means also moving said members longitudinally while they are moving into and out of shearing relation with each other.

14. In a shaving machine, a stationary hollow tubular body having a portion cut away to provide a longitudinal opening communicating with the interior thereof, a pair of tubular movable members mounted in said body, one of said members being nested in the other, means forming continuous longitudinal shearing edges on said tubular members, said edges being adapted to cooperate with each other, and power means connected to both of said members for oscillating said members to bring their shearing edges into and out of shearing relation with each other, the space between said shearing edges when the latter are out of shearing relation with each other forming an open longitudinal slot.

IRVING STEIN.